United States Patent
Deiss et al.

(10) Patent No.: US 10,248,353 B2
(45) Date of Patent: Apr. 2, 2019

(54) DYNAMICLY FREEING STORAGE SPACE IN TIERED STORAGE SYSTEMS

(71) Applicant: International Business Machines Corporation, Armonk, NY (US)

(72) Inventors: Andrew E. Deiss, McNeal, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 14/990,695

(22) Filed: Jan. 7, 2016

(65) Prior Publication Data

US 2017/0199700 A1 Jul. 13, 2017

(51) Int. Cl.
*G06F 12/00* (2006.01)
*G06F 3/06* (2006.01)
*G06F 11/20* (2006.01)

(52) U.S. Cl.
CPC .......... *G06F 3/0647* (2013.01); *G06F 3/0608* (2013.01); *G06F 3/0683* (2013.01); *G06F 3/0685* (2013.01); *G06F 11/2007* (2013.01); *G06F 2201/85* (2013.01)

(58) Field of Classification Search
CPC ....... G06F 2009/45595; G06F 9/45558; G06F 3/0685; G06F 3/061; G06F 3/0647; G06F 3/0608; G06F 3/0683; G06F 11/2007; G06F 2201/85
See application file for complete search history.

(56) References Cited

U.S. PATENT DOCUMENTS

| 8,935,493 B1* | 1/2015 | Dolan | G06F 3/0649 711/117 |
| 9,639,539 B1* | 5/2017 | Devta | G06F 17/30082 |
| 2006/0010169 A1* | 1/2006 | Kitamura | G06F 3/0605 |
| 2009/0276588 A1* | 11/2009 | Murase | G06F 3/0608 711/160 |
| 2011/0010514 A1* | 1/2011 | Benhase | G06F 3/061 711/162 |
| 2012/0278668 A1* | 11/2012 | Chiu | G06F 12/02 714/700 |

* cited by examiner

*Primary Examiner* — Arvind Talukdar
(74) *Attorney, Agent, or Firm* — Nelson and Nelson; Daniel P. Nelson; Alexis V. Nelson

(57) ABSTRACT

A method for dynamically freeing storage space in a tiered storage system includes reading attribute values associated with data sets residing on a first storage tier. The method compares characteristics of the data sets to the attribute values to determine which initial data sets qualify to be moved from the first storage tier to a second storage tier. The method further determines whether movement of the initial data sets creates a desired amount of free space on the first storage tier. In the event the movement does not create the desired amount of free space, the method modifies the attribute values, determines which additional data sets qualify to be moved from the first storage tier to the second storage tier, and recalculates the amount of free space that would be generated. A corresponding system and computer program product are also disclosed.

17 Claims, 6 Drawing Sheets

DYNAMICLY FREEING STORAGE SPACE IN TIERED STORAGE SYSTEMS

BACKGROUND

Field of the Invention

This invention relates to systems and methods for dynamically freeing storage space in tiered storage systems.

Background of the Invention

Tiered storage, also known as hierarchical storage, is a storage architecture typically containing high-cost and lost-cost storage media logically arranged into tiers. This architecture may be used to efficiently utilize high-cost and lost-cost storage media to provide a desired level of cost and performance. For example, certain high-speed storage devices, such as solid state drives, are faster and more expensive than storage devices such as hard disk drives, which are in turn faster and more expensive than magnetic tape drives or optical drives. While it may be desirable to store all data on faster storage devices such as solid state drives, this can be impractical and prohibitively expensive. Instead, tiered storage enables slower and less expensive storage devices to store the bulk of an enterprise's data. This data may then be moved or copied to faster storage devices when needed. This may enable faster devices to act as cache for slower devices.

In today's tiered storage systems, "management classes" may be established to specify how and when data is moved between storage tiers. Such "management classes" may consist of collections of management attributes, defined by a storage administrator, to control various tasks performed within a tiered storage system. Storage management software may use attributes in a management class to determine when to move data sets associated with the management class from primary storage to secondary storage. This, in turn, may be used to free up storage space on the primary storage.

For example, a management class may specify that data sets associated with the management class be migrated from primary storage to secondary storage after the data sets have resided on the primary storage for a certain amount of time. Additionally, or alternatively, the management class may specify how many generations of a data set may be stored on primary storage. Older generations exceeding the number of generations specified by the management class may be moved to secondary storage. The management class may also include threshold values that specify how much storage to free in primary storage when data sets are migrated from primary storage to secondary storage.

Unfortunately, even when data sets are moved from primary storage to secondary storage in accordance with attributes of a management class, insufficient free space may be created on the primary storage. This may result in free space threshold values not being met. This may also prevent various indicators that storage management software relies on from being reset. This can cause primary storage to run out of storage space at critical times, possibly causing system outages.

In view of the foregoing, what are needed are systems and methods to dynamically free storage space in tiered storage systems. Ideally, such systems and methods will enable free space thresholds to be met.

SUMMARY

The invention has been developed in response to the present state of the art and, in particular, in response to the problems and needs in the art that have not yet been fully solved by currently available systems and methods. Accordingly, the invention has been developed to provide systems and methods to dynamically free storage space in tiered storage systems. The features and advantages of the invention will become more fully apparent from the following description and appended claims, or may be learned by practice of the invention as set forth hereinafter.

Consistent with the foregoing, a method for dynamically freeing storage space in a tiered storage system is disclosed. In one embodiment, such a method includes reading attribute values associated with data sets residing on a first storage tier. The method compares characteristics of the data sets to the attribute values to determine which initial data sets qualify to be moved from the first storage tier to a second storage tier. The method further determines whether movement of the initial data sets from the first storage tier to the second storage tier creates a desired amount of free space on the first storage tier. In the event the movement does not create the desired amount of free space, the method modifies the attribute values and determines which additional data sets qualify to be moved from the first storage tier to the second storage tier. The method then determines whether movement of the initial data sets and the additional data sets from the first storage tier to the second storage tier creates the desired amount of free space.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
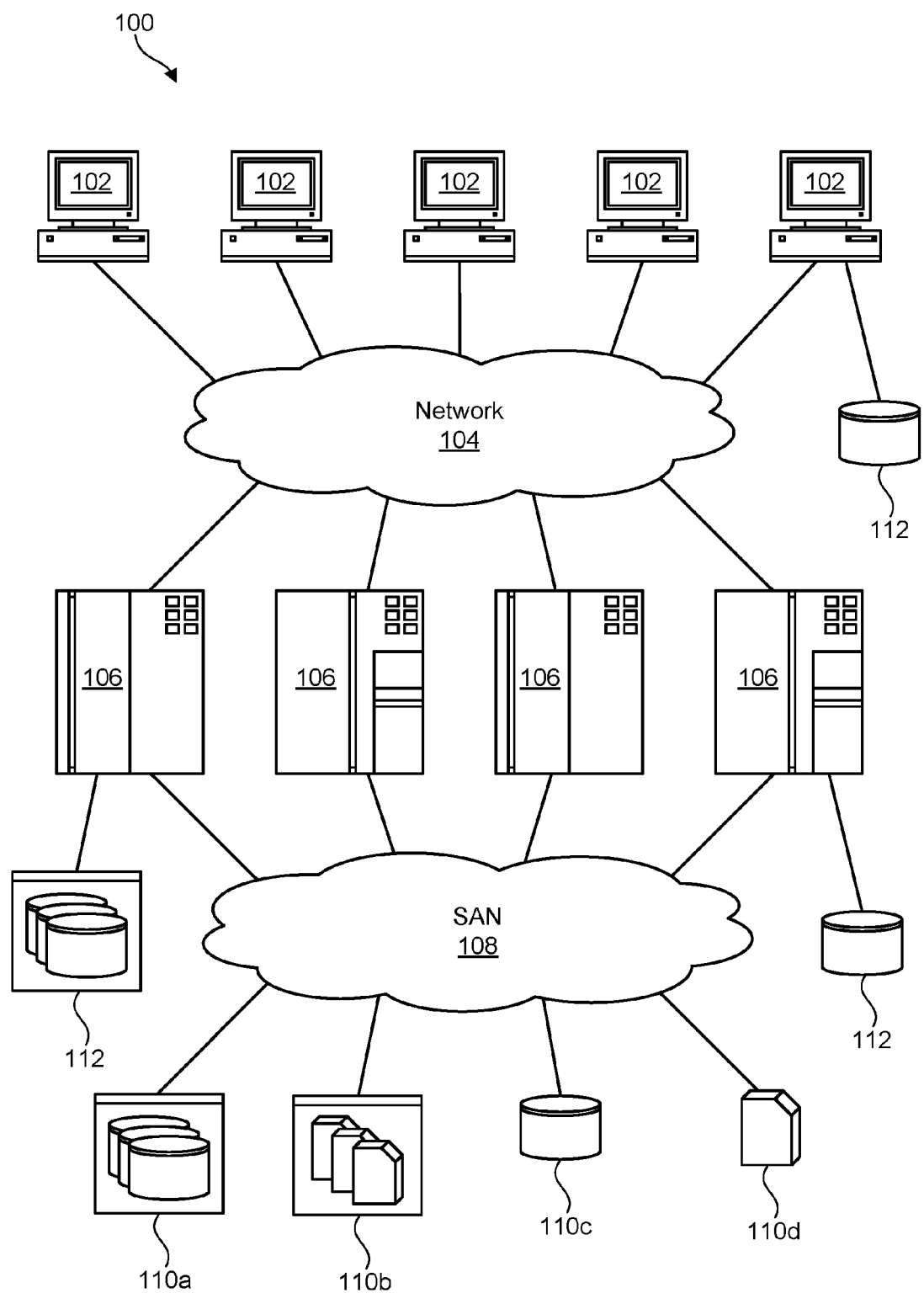
FIG. 1 is a high-level block diagram showing one example of an environment in which a system and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network architecture 100 is illustrated. The network architecture 100 is presented to show one example of an environment where embodiments of the invention may operate. The network architecture 100 is presented only by way of example and not limitation. Indeed, the apparatus and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

In certain embodiments, the storage systems 110 illustrated in FIG. 1 may be organized into a tiered storage configuration. That is, some storage systems 110 (such as faster, higher-performance storage systems) may be used as primary storage, while other storage systems 110 (such as slower, lower-performance storage systems 110) may be used as secondary storage. For example, a disk array 100a comprising solid state drives and/or hard disk drives may be used as primary storage, while a tape library 110b may be used as secondary storage. Data that is hotter, newer, and/or more important may be stored on primary storage, while data that is colder, older, and/or less important may be moved to secondary storage.

Figure 2:
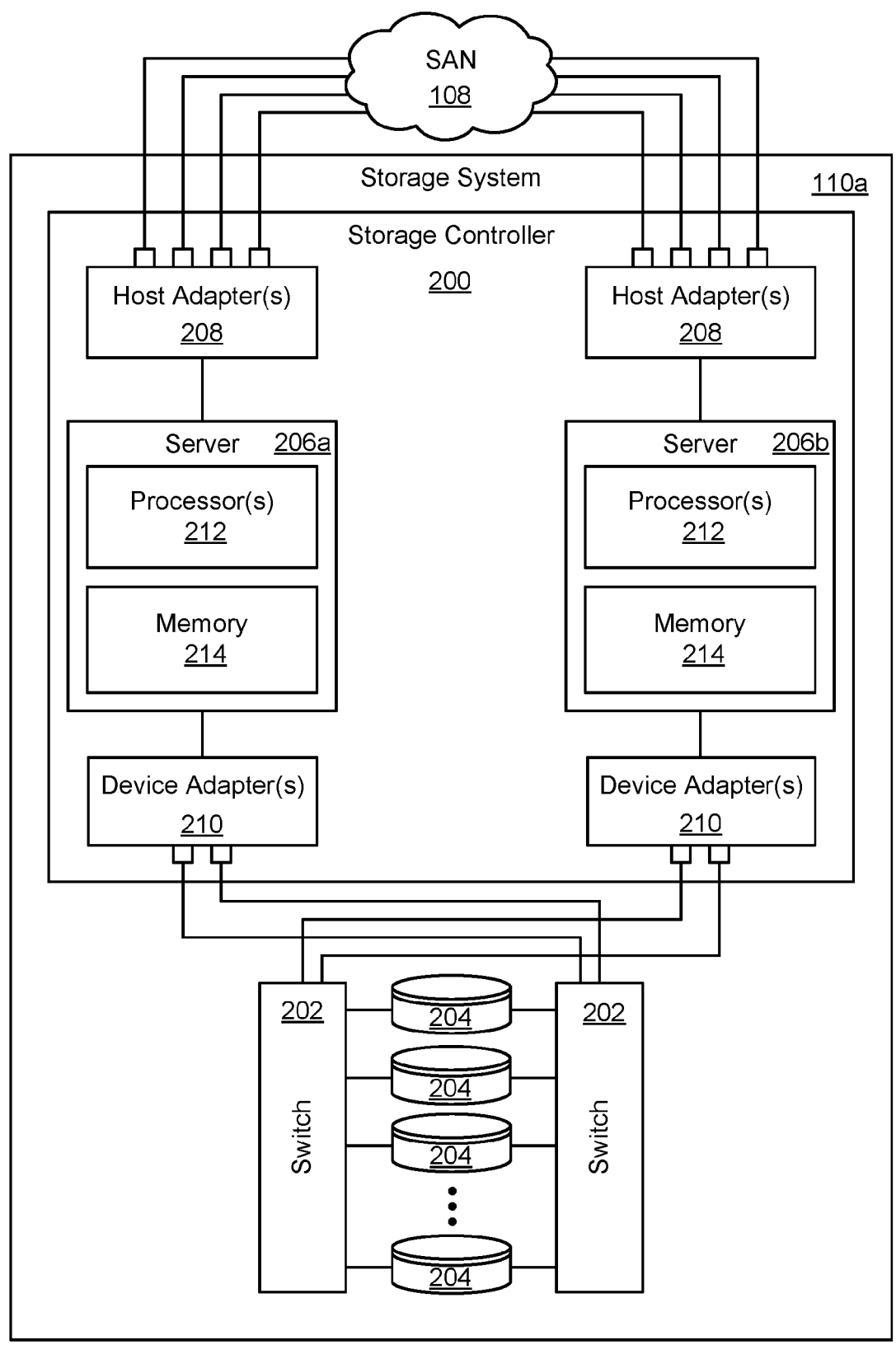
FIG. 2 is a high-level block diagram showing one embodiment of storage system providing primary and/or secondary storage.

Referring to FIG. 2, one example of a storage system 110a containing an array of hard-disk drives 204 and/or solid-state drives 204 is illustrated. The internal components of the storage system 110a are shown since tiered storage system may, in certain embodiments, be implemented within such a storage system 110a. For example, higher performance storage drives 204 may be used as primary storage, while lower performance storage drives 204, either on the same or a different storage system 110a, may be used as secondary storage. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the methods disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
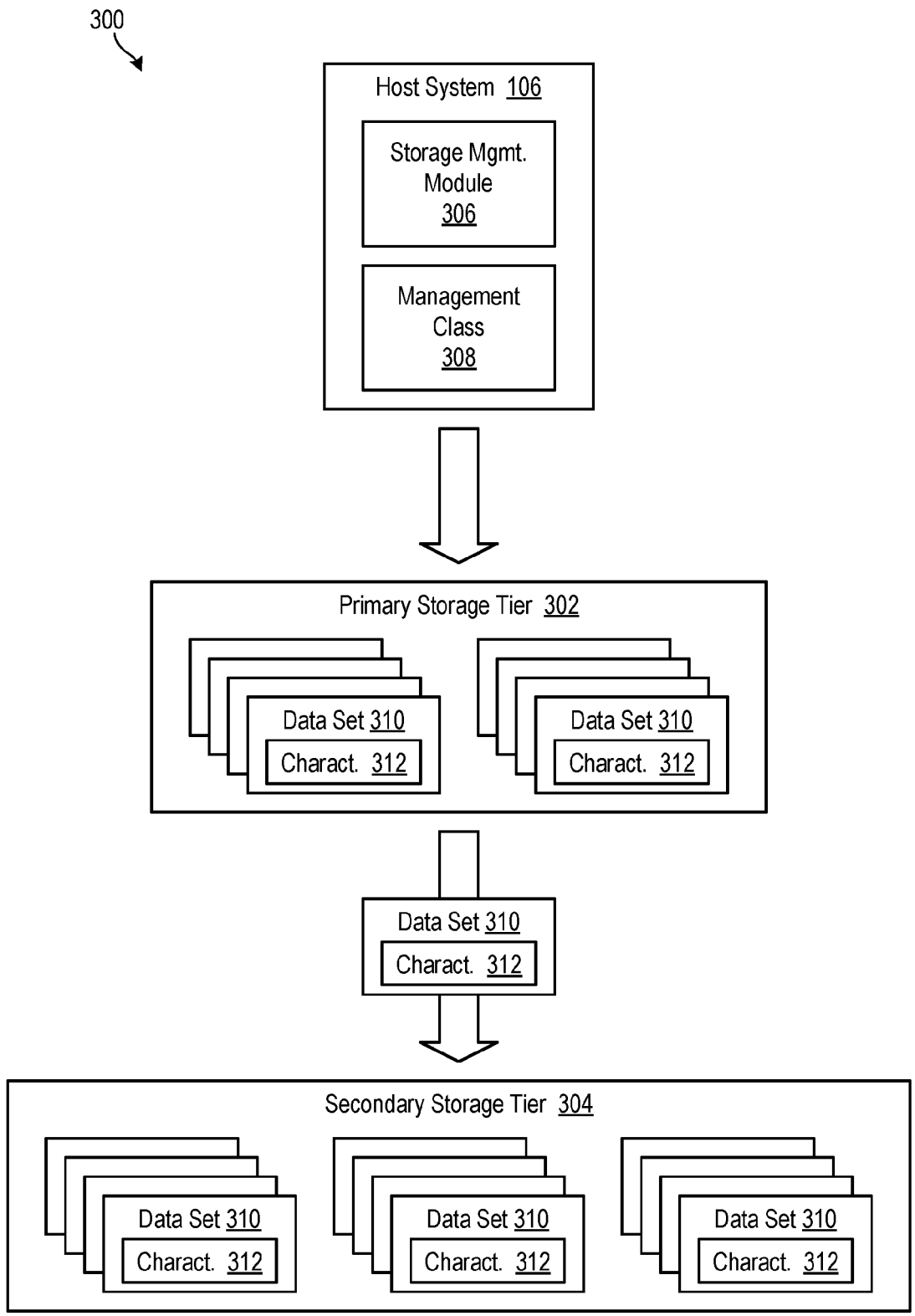
FIG. 3 is a high-level block diagram showing movement of data sets between primary and secondary storage.

Referring to FIG. 3, one embodiment of a tiered storage system 300 comprising a primary storage tier 302 and a secondary storage tier 304 is illustrated. As shown, each of the storage tiers 302, 304 stores one or more data sets 310. Data sets 310 that are stored on each tier 302, 304 may be based on characteristics 312 of the data sets 310, such as the age of the data sets 310, the size of the data sets 310, the generation represented by the data sets 310, or the like.

As shown, a host system 106 includes a storage management module 306 to move data sets 310 between the storage tiers 302, 304 in accordance with their characteristics 312. A management class 308, associated with particular data sets 310, may establish how and when the data sets 310 are moved between the storage tiers 302, 304. For example, the management class 308 specify a number of days a data set 310 is retained on the primary storage tier 302, a number of generations (e.g., previous versions, etc.) of a data set 310 that may be retained on the primary storage tier 302, and/or the size of data sets 310 that may be retained on the primary storage tier 302. When the characteristics 312 of data sets 310 satisfy the criteria specified in the management class 308, the storage management module 306 may move the data sets 310 from the primary storage tier 302 to the secondary storage tier 304 (or vice versa). This will ideally free up storage space on the primary storage tier 302 that can be used for other purposes, such as storing new data sets 310 or accommodating growth of existing data sets 310.

Figure 4:
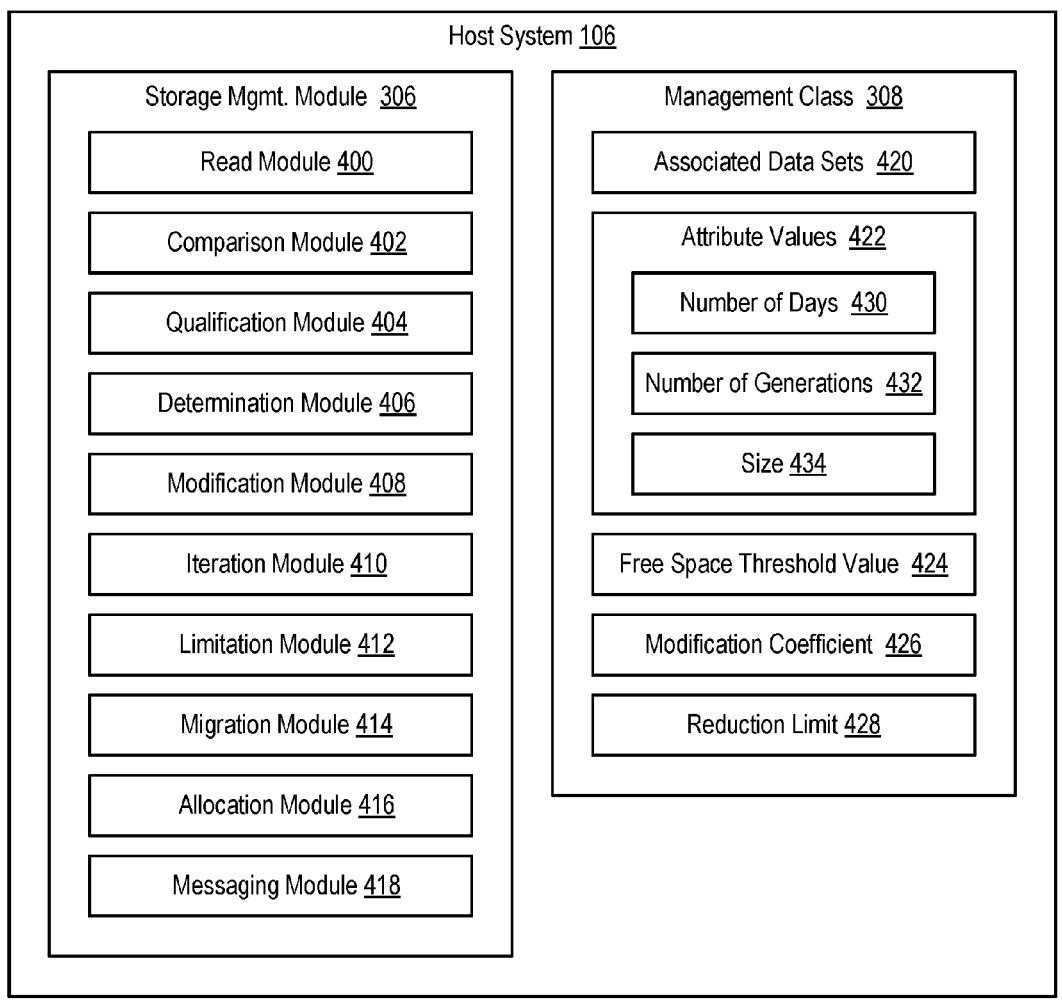
FIG. 4 is a high-level block diagram showing one embodiment of a storage management module and management class in accordance with the invention.

Referring to FIG. 4, the storage management module 306 and management class 308 discussed in association with FIG. 3 are shown in greater detail. As shown, the storage management module 306 may include various sub-modules to provide various features and functions. These sub-modules may be implemented in hardware, software, firmware, or combinations thereof. These sub-modules may include one or more of a read module 400, comparison module 402, qualification module 404, determination module 406, modification module 408, iteration module 410, limitation module 412, migration module 414, allocation module 416, and messaging module 418.

As further shown, the management class 308 may be tied to one or more associated data sets 420. The management class 308 may also specify one or more attribute values 422. These attribute values 422 may include, for example, a number 430 of days (or other time period) that data sets 310 may be retained on a primary storage tier 302, a number 432 of generations of a data set 310 that may be stored on a primary storage tier 302, a size of a data set 310 that may be stored on a primary storage tier 302, and/or the like. The storage management module 306 may use the attribute values 422 to determine if and when to move data sets 310 from the primary storage tier 302 to the secondary storage tier 304.

The management class 308 may also, in certain embodiments, designate a free space threshold value 424. This free space threshold value 424 may indicate an amount of free space that is ideally freed when the storage management module 306 moves data sets 310 from the primary storage tier 302 to the secondary storage tier 304. If the free space threshold 424 is not met, various actions may be taken such as notifying a system administrator, allocating new storage space to the primary storage tier 302, or the like. The management class 308 may also include a modification coefficient 426. The modification coefficient 426 may be a number, percentage, fraction, decimal, or the like, that is used to reduce the attribute values 422 with the goal of freeing up more storage space on the primary storage tier 302. In certain embodiments, an attribute value 422 is reduced by multiplying the modification coefficient 426 by the attribute value 422.

The management class 308 may also designate a reduction limit 428. The reduction limit 428 may limit the amount that an attribute value 422 can be reduced. For example, if the modification coefficient 426 is set at ten percent and the reduction limit 428 is set at fifty percent, the attribute value 422 may be reduced in ten percent increments until it is reduced by a maximum of fifty percent. This will prevent data sets 310 that are too young from being migrated from the primary storage tier 302 to the secondary storage tier 304, and/or prevent too many generations of a data set 310 from being migrated from the primary storage tier 302 to the secondary storage tier 304.

In certain embodiments, the reduction limit 428 and/or modification coefficient 426 may be set based on the importance or criticality of data sets 310. For example, more critical data sets 310 associated with a first management class 308 may be assigned a first reduction limit 428 and modification coefficient 426 whereas less critical data sets 310 associated with a second management class 308 may be assigned a second reduction limit 428 and modification coefficient 426. For example, the reduction limit 428 may be set to allow less or no adjustment of the attribute values 422 for more critical data sets 310 and greater adjustment for less critical data sets 310. This will ideally provide less leeway to migrate more critical data sets 310 off of the primary storage tier 302.

The storage management module 306 may be configured to execute at scheduled times or intervals, or in response to certain thresholds, such as free space on the primary storage tier 302 falling below a specified level. When the storage management module 306 is invoked, the read module 400 may read the attribute values 422 of the management class 308. The comparison module 402 may then compare the attribute values 422 to the characteristics 312 of data sets 310 residing on the primary storage tier 302. For example, the comparison module 402 may compare the attribute values 422 to the age of data sets 310 on the primary storage tier 302, or the number of generations of data sets 310 on the primary storage tier 302. Based on this comparison, the qualification module 404 may determine which data sets 310 qualify to be moved from the primary storage tier 302 to the secondary storage tier 304.

At this point, the migration module 414 may migrate data sets 310 that qualify from the primary storage tier 302 to the secondary storage tier 304. The determination module 406 may then determine if the movement freed sufficient storage space on the primary storage tier 302 to satisfy the free space threshold value 424 associated with the management class 308. If not, the modification module 408 may modify the attribute values 422 using the modification coefficient 426 and the comparison module 402 and qualification module 404 may determine which additional data sets 310 qualify to be moved from the primary storage tier 302 to the secondary storage tier 304. The determination module 406 may then determine if the movement of these additional data sets 310 will free enough space on the primary storage tier 302 to satisfy the free space threshold value 424.

The iteration module 410 may repeat this process (i.e., invoking the modification module 408 to modify the attribute values 422, the comparison module 402 and qualification module 404 to determine which additional data sets 310 would qualify for migration, and the determination module 406 to determine how much storage space would be freed by the migration) until the free space threshold value 424 is satisfied or until the reduction limit 428 is reached. The limitation module 412 may ensure that the attribute values 422 are not reduced below the reduction limit 428.

In the event the reduction limit 428 is reached but sufficient free space has not been achieved even after migrating all eligible data sets 310, the allocation module 416 may attempt to allocate additional storage space to the primary storage tier 302. For example, if one or more additional volumes are available in a free storage pool to add to the primary storage tier 302, the allocation module 416 may add volumes to the primary storage tier 302 until the free space threshold 424 is satisfied. If not enough additional volumes are available to satisfy the free space threshold 424, the messaging module 418 may send a message to a user or administrator. This message may indicate that not enough storage space can be freed in the primary storage tier 302 either by migrating data sets 310 and/or adding additional volumes to the primary storage tier 302. In certain embodiments, the messaging module 418 may notify the user/administrator that a free storage pool may need to be replenished with additional volumes.

The storage management module 306 may function differently in different embodiments. For example, in a first embodiment, the storage management module 306 may be configured to perform an initial analysis of data sets 310 on the primary storage tier 302 and migrate data sets 310 that qualify for migration. The storage management module 306 may then determine whether the migration freed sufficient storage space. If not, the storage management module 306 may iteratively adjust the attribute values 422 until it is determined which additional data sets 310 can be migrated to satisfy the free space threshold value 424. In other words, the storage management module 306 performs an initial migration of data sets 310 based on the attribute values 422, and then migrates additional data sets 310 as needed in an attempt to meet the free space threshold 424. Such a technique will be discussed in association with FIG. 5.

Alternatively, before performing any migration, the storage management module 306 may analyze the data sets 310 on the primary storage tier 302 and adjust the attribute values 422 until it determines which set of data sets 310 need to be migrated to meet the free space threshold 424. Only then will it migrate the data sets 310. If the free space threshold 424 is still not met, the storage management module 306 may allocate additional storage space to the primary storage tier 302 from the free storage pool. Such a technique will be discussed in association with FIG. 6.

Figure 5:
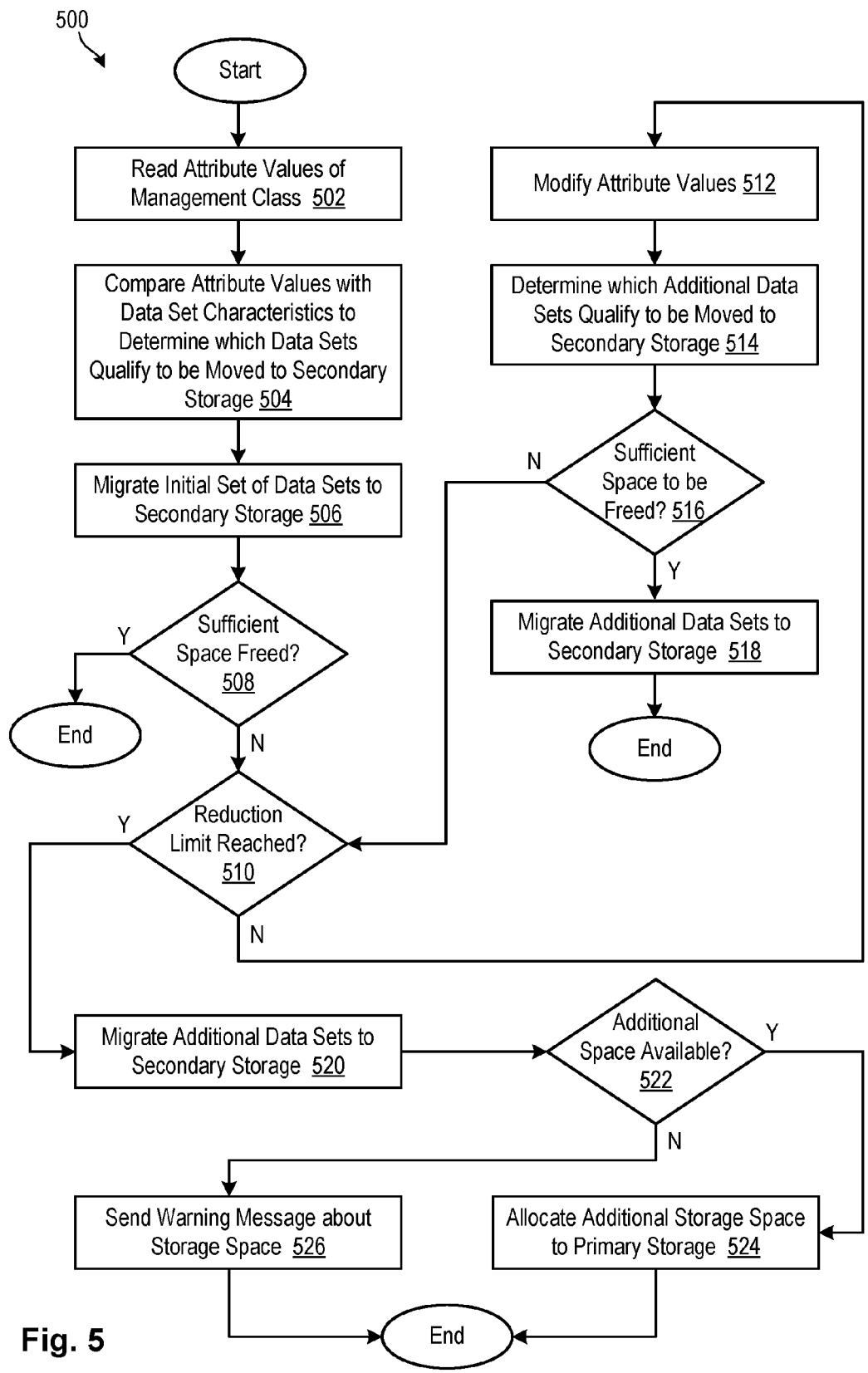
FIG. 5 is a flow diagram showing one embodiment of a method for dynamically freeing storage space in a tiered storage system.

Referring to FIG. 5, one embodiment of a method 500 for dynamically freeing storage space in a tiered storage system 300 is illustrated. Such a method 500 may be configured to execute at scheduled times or intervals, or in response to certain thresholds, such as free space on the primary storage tier 302 falling below a specified level. As shown, the method 500 initially reads 502 attribute values 422 of a management class 308 associated with data sets 310 on a primary storage tier 302. The method 500 then compares 504 the attribute values 422 with characteristics 312 of the data sets 310 to determine which data sets 310 qualify to be migrated from the primary storage tier 302 to a secondary storage tier 304. Upon making this determination, the method 500 migrates 506 the initial set of data sets 310 to the secondary storage tier 304.

The method then determines 508 whether the migration freed sufficient storage space on the primary storage tier 302. In certain embodiments, this may be accomplished by comparing the amount of freed storage space with the free space threshold value 424 previously discussed. If sufficient free space was freed, the method 500 ends.

If sufficient free space was not freed, the method 500 determines 510 whether the reduction limit 428 has been reached. If the reduction limit 428 has not been reached, the method 500 modifies 512 the attribute values 422, such as by multiplying the attribute values 422 by the modification coefficient 426 previously discussed. The method 500 then determines 514 which additional data sets 310 qualify to be moved from the primary storage tier 302 to the secondary storage tier 304 based on the modified attribute values 422. The method 500 further determines 516 whether migrating these additional data sets 310 would free sufficient storage space on the primary storage tier 302. If so, the method 500 migrates 518 the additional data sets 310 to the secondary storage tier 304 and the method 500 ends.

If migrating the additional data sets 310 would not free sufficient storage space on the primary storage tier 302, the method 500 checks 510 whether the reduction limit 428 has been reached and, if the reduction limit 428 has not been reached, repeats steps 512, 514, 516 in an iterative manner until either the free space threshold 424 has been satisfied or the reduction limit 428 is reached. If, at step 516, the free space threshold 424 is reached, the method 500 migrates 518 the additional data sets 310 to the secondary storage tier 304 and the method 500 ends.

If, on the other hand, the reduction limit 428 is reached at step 510, the method 500 migrates 520 the additional data set 310 to the secondary storage tier 304 and performs additional steps to determine if the free space threshold 424 can be met. Specifically, the method 500 determines 522 whether additional storage space is available in a free storage pool. If additional storage space is available, the method 500 allocates 524 the additional storage space to the primary storage tier 302 and the method 500 ends. If sufficient storage space is not available, the method 500 optionally allocates whatever storage space is available and sends 526 a warning message to a user/administrator indicating that the free space threshold 424 for the primary storage tier 302 has not been met and/or that insufficient storage space exists in the free storage pool to satisfy the free space threshold 424. This may prompt the user/administrator to add additional volumes to the free storage pool and/or adjust the attribute values 422, modification coefficient 426, reduction limit 428, or the like, in the management class 308, so that additional storage space is freed on the primary storage tier 302.

Figure 6:
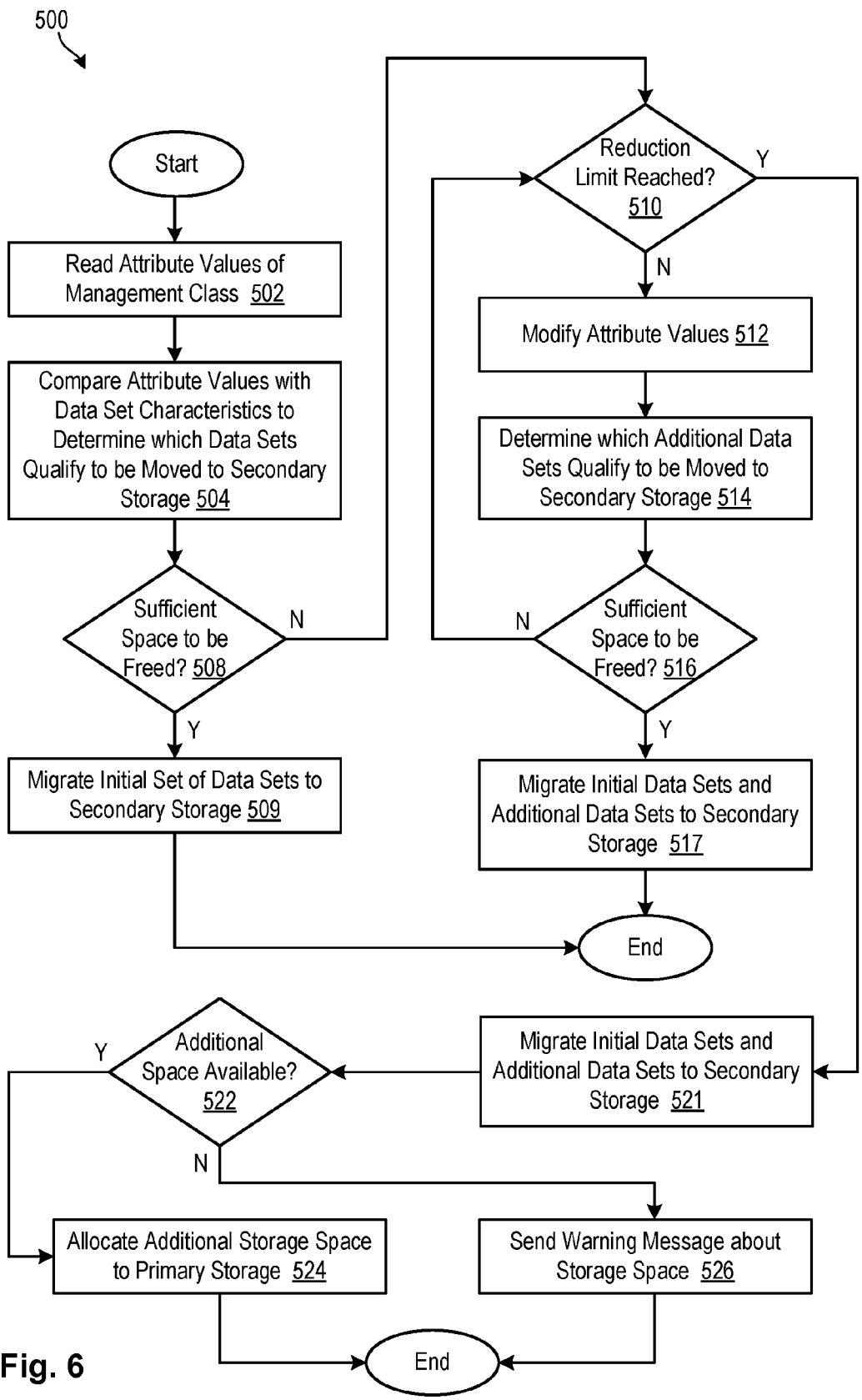
FIG. 6 is a flow diagram showing another embodiment of a method for dynamically freeing storage space in a tiered storage system.

Referring to FIG. 6, another embodiment of the method 500 for dynamically freeing storage space in a tiered storage system 300 is illustrated. This embodiment is similar to the embodiment illustrated in FIG. 5, except that this embodiment only migrates data sets 310 from the primary storage tier 302 to the secondary storage tier 304 after adjusting the attribute values 422. In other words, the method 500 adjusts the attribute values 422 and performs the analysis upfront and then migrates the data sets 310 when the free space threshold 424 is met or the reduction limit 428 is reached. Many of the method steps in FIGS. 5 and 6 are the same. Those steps that are the same have been assigned the same numbering. Those steps that differ have been assigned different numbers.

As shown in FIG. 6, the method 500 initially reads 502 attribute values 422 of a management class 308 and compares 504 the attribute values 422 with data set characteristics 312 to determine which data sets 310 qualify to be migrated from the primary storage tier 302 to a secondary storage tier 304. The method 500 then determines 508 whether migrating the initial set of data sets 310 will create sufficient storage space on the primary storage tier 302. If sufficient storage space will be freed, the method 500 migrates 509 the initial set of data sets 310 to the secondary storage tier 304 and the method 500 ends.

If sufficient free space will not be freed, the method 500 determines 510 whether the reduction limit 428 has been reached. If the reduction limit 428 has not been reached, the method 500 modifies 512 the attribute values 422 and determines 514 which additional data sets 310 qualify to be moved from the primary storage tier 302 to the secondary storage tier 304 based on the modified attribute values 422. The method 500 then determines 516 whether migrating the additional data sets 310 in addition to the initial set of data sets 310 would free sufficient space on the primary storage tier 302. If so, the method 500 migrates 517 the initial set of data sets 310 and the additional data sets 310 to the secondary storage tier 304 and the method 500 ends.

If sufficient storage space would not be freed on the primary storage tier 302, the method 500 checks 510 whether the reduction limit 428 has been reached and, if the reduction limit 428 has not been reached, repeats steps 512, 514, 516 in an iterative manner until either the free space threshold 424 is met or the reduction limit 428 is reached. If, at step 516, the free space threshold 424 is met, the method 500 migrates 517 the initial set of data sets 310 and the additional data sets 310 to the secondary storage tier 304 and the method 500 ends.

If, on the other hand, the reduction limit 428 is reached at step 510 prior to satisfying the free space threshold 424, the method 500 migrates 521 the initial set of data sets 310 and the additional data set 310 to the secondary storage tier 304 and performs additional steps to determine if the free space threshold 424 can be met. Specifically, the method 500 determines 522 whether additional storage space is available in a free storage pool. If additional storage space is available, the method 500 allocates 524 the additional storage space to the primary storage tier 302 and the method 500 ends. Is sufficient storage space is not available, the method 500 optionally allocates whatever storage space is available and sends 526 a warning message to a user/administrator indicating that the free space threshold 424 for the primary storage tier 302 has not been met and that there is insufficient storage space in the free storage pool to satisfy the free space threshold 424.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically freeing storage space in a tiered storage system, the method comprising:
    establishing a first management class and a second management class, wherein the first management class is associated with first data sets and the second management class is associated with second data sets, the first data sets and the second data sets residing on a first storage tier;
    reading a first attribute value associated with the first management class and a second attribute value associated with the second management class;
    comparing characteristics of the first data sets to the first attribute value and characteristics of the second data sets to the second attribute value to determine which initial data sets of the first data sets and second data sets qualify to be moved from the first storage tier to a second storage tier;
    determining whether movement of the initial data sets from the first storage tier to the second storage tier creates a desired amount of free space on the first storage tier;
    in the event the movement does not create the desired amount of free space, applying a first modification coefficient to the first attribute value and a second modification coefficient to the second attribute value to determine which additional data sets of the first data sets and second data sets qualify to be moved from the first storage tier to the second storage tier, wherein the first modification coefficient differs from the second modification coefficient; and
    determining whether movement of the initial data sets and the additional data sets from the first storage tier to the second storage tier creates the desired amount of free space.

2. The method of claim 1, further comprising moving the initial data sets and the additional data sets from the first storage tier to the second storage tier.

3. The method of claim 1, wherein applying the first modification coefficient to the first attribute value and the second modification coefficient to the second attribute value comprises multiplying the first attribute value by the first modification coefficient and the second attribute value by the second modification coefficient.

4. The method of claim 1, wherein applying the first modification coefficient to the first attribute value and the second modification coefficient to the second attribute value comprises iteratively applying the first modification coefficient to the first attribute value and the second modification coefficient to the second attribute value.

5. The method of claim 1, wherein applying the first modification coefficient to the first attribute value and the second modification coefficient to the second attribute value comprises applying the first modification coefficient to the first attribute value until a first reduction limit is reached and applying the second modification coefficient to the second attribute value until a second reduction limit is reached.

6. The method of claim 5, further comprising, in the event the first reduction limit and the second reduction limit are reached without generating the desired amount of free space, adding storage space to the first storage tier.

7. A computer program product to dynamically free storage space in a tiered storage system, the computer program product comprising a computer-readable memory having computer-usable program code embodied therein, the computer-usable program code configured to perform the following when executed by at least one processor:
    establish a first management class and a second management class, wherein the first management class is associated with first data sets and the second management class is associated with second data sets, the first data sets and the second data sets residing on a first storage tier;
    read a first attribute value associated with the first management class and a second attribute value associated with the second management class;
    compare characteristics of the first data sets to the first attribute value and characteristics of the second data sets to the second attribute value to determine which initial data sets of the first data sets and second data sets qualify to be moved from the first storage tier to a second storage tier;
    determine whether movement of the initial data sets from the first storage tier to the second storage tier creates a desired amount of free space on the first storage tier;
    in the event the movement does not create the desired amount of free space, apply a first modification coefficient to the first attribute value and a second modification coefficient to the second attribute value to determine which additional data sets of the first data sets and second data sets qualify to be moved from the first storage tier to the second storage tier, wherein the first modification coefficient differs from the second modification coefficient; and
    determine whether movement of the initial data sets and the additional data sets from the first storage tier to the second storage tier creates the desired amount of free space.

8. The computer program product of claim 7, wherein the computer-usable program code is further configured to move the initial data sets and additional data sets from the first storage tier to the second storage tier.

9. The computer program product of claim 7, wherein applying the first modification coefficient to the first attribute value and the second modification coefficient to the second attribute value comprises multiplying the first attribute value by the first modification coefficient and the second attribute value by the second modification coefficient.

10. The computer program product of claim 7, wherein applying the first modification coefficient to the first attribute value and the second modification coefficient to the second attribute value comprises iteratively applying the first modification coefficient to the first attribute value and the second modification coefficient to the second attribute value.

11. The computer program product of claim 7, wherein applying the first modification coefficient to the first attribute value and the second modification coefficient to the second attribute value comprises applying the first modification coefficient to the first attribute value until a first reduction limit is reached and applying the second modification coefficient to the second attribute value until a second reduction limit is reached.

12. The computer program product of claim 11, further comprising wherein the computer-usable program code is further configured to, in the event the first reduction limit and the second reduction limit are reached without generating the desired amount of free space, add storage space to the first storage tier.

13. A system for dynamically freeing storage space in a tiered storage system, the system comprising:
    at least one processor;
    at least one memory device coupled to the at least one processor and storing instructions for execution on the at least one processor, the instructions causing the at least one processor to;
        establish a first management class and a second management class, wherein the first management class is associated with first data sets and the second management class is associated with second data sets, the first data sets and the second data sets residing on a first storage tier;
        read a first attribute value associated with the first management class and a second attribute value associated with the second management class;
        compare characteristics of the first data sets to the first attribute value and characteristics of the second data sets to the second attribute value to determine which initial data sets of the first data sets and second data sets qualify to be moved from the first storage tier to a second storage tier;
        determine whether movement of the initial data sets from the first storage tier to the second storage tier creates a desired amount of free space on the first storage tier;
        in the event the movement does not create the desired amount of free space, apply a first modification coefficient to the first attribute value and a second modification coefficient to the second attribute value to determine which additional data sets of the first data sets and second data sets qualify to be moved from the first storage tier to the second storage tier, wherein the first modification coefficient differs from the second modification coefficient; and
        determine whether movement of the initial data sets and the additional data sets from the first storage tier to the second storage tier creates the desired amount of free space.

14. The system of claim 13, wherein applying the first modification coefficient to the first attribute value and the second modification coefficient to the second attribute value comprises multiplying the first attribute value by the first modification coefficient and the second attribute value by the second modification coefficient.

15. The system of claim 13, wherein applying the first modification coefficient to the first attribute value and the second modification coefficient to the second attribute value comprises iteratively applying the first modification coefficient to the first attribute value and the second modification coefficient to the second attribute value.

16. The system of claim 13, wherein applying the first modification coefficient to the first attribute value and the second modification coefficient to the second attribute value comprises applying the first modification coefficient to the first attribute value until a first reduction limit is reached and applying the second modification coefficient to the second attribute value until a second reduction limit is reached.

17. The system of claim 16, wherein the instructions further cause the at least one processor to, in the event the first reduction limit and the second reduction limit are reached without generating the desired amount of free space, add storage space to the first storage tier.

* * * * *